3,761,297
PROCESS FOR THE PREPARATION OF DYEING PIGMENTS
Juan Maymo Figueras, Calle Balmes 270, Barcelona, Spain
No Drawing. Filed Sept. 2, 1970, Ser. No. 69,139
Claims priority, application Spain, Sept. 8, 1969, 371,591
Int. Cl. C09c 1/36, 3/00
U.S. Cl. 106—289                   9 Claims

ABSTRACT OF THE DISCLOSURE

A dyeing pigment is made by fixing an anthraquinone, indigoid or a phthalocyanine dyestuff in the form of a leuco base to a substrate. Titanium dioxide is particularly mentioned as the substrate. The dyestuff, in a colloidal dispersion in aqueous alkali, is reduced to form the leuco base, the substrate is added to it and the solution is oxidised in situ to fix the leuco base to the substrate. Separation procedures yield a paste which is dried and triturated to produce the dyeing pigment as an impalpable powder. Oxidation is described by introduction of air or oxygen into the hot solution. Further treatment of the dyeing pigment by various solvents under pressure and heat may be performed to remove dyestuff residues not firmly fixed to the substrate. The insolubility and non-toxicity of the dyeing pigments make them useful in cosmetics, foodstuffs and pharmaceuticals.

BACKGROUND OF THE INVENTION

The present invention relates to a process developed for the preparation of insoluble and non-toxic colouring or dyeing pigments, the properties of which afford a wide range of possibilities for their use.

The preparation of pigment dyes which are insoluble in any medium and which are highly resistant to chemical agents, especially to strong acids and alkalis, which can withstand the action of light and weather, and in addition are capable of being produced economically, has always been an important problem in the industry concerned with synthetic dyes. Furthermore, in the specific case of those industries in which the economic question is of relatively secondary importance, due to the extremely small quantity of colouring agents employed relative to the total cost of the final product, such as in pharmaceutics, cosmetics and foodstuffs, it has been felt that there is a lack of a range of pigments which, while providing substantial possibilities for practical utilisation, are also free from any kind of toxicity.

It is desirable therefore to have a process for the preparation of pigments which have special qualities as to non-toxicity and non-deterioration, since this would fill a "gap" among the many not wholly satisfactory colouring agents in the dyestuff industry due to the limitations imposed by the lack of products suitable for a predetermined purpose in products which are intended to be applied to the human body, either by simple contact (cosmetics, perfumes, toys, articles of personal use), or by possible or certain ingestion (the pharmaceutical and foodstuffs industries).

SUMMARY OF THE INVENTION

According to the present invention, there is provided a process for the preparation of a dyeing pigment from a dyestuff which is an anthraquinone, an indigoid or a phthalocyanine which includes the steps of:

(a) Mixing the said dyestuff in an aqueous alkaline medium under agitation and heating to effect a colloidal dispersion of the dyestuff, (b) Subjecting the colloidal dispersion to a reducing treatment to obtain a solution of the dyestuff in the form of a leuco base, (c) Adding to the solution obtained in step (b), under agitation and heating, a substrate, (d) Subjecting the mixture obtained in step (c) to oxidation to fix the dyestuff leuco base to the substrate, (e) Separating the solid dyeing pigment formed in step (d).

Using the process of the present invention, there can be achieved the permanent dyeing of an inorganic substrate comprising an impalpable powder (generally particles ranging between 5 and $0.1\mu$) with a synthetic colouring agent. Thereby, a complex is obtained having properties essentially different from those of hitherto known pigments, whether organic or inorganic, and also from the conventional lacs prepared with colouring agents conventionally used for this purpose, especially the azo dyes, the xanthene and some of the quinone dyes, etc., on various substrates, normally on aluminium hydroxide or alkaline-earth metal salts, especially barium salts. It is then possible to produce various types of chemical combinations of the dyestuffs with the substrate, one of the most typical thereof being the substitution of alkaline cations of the acid or carboxylic radicals by alkaline earth metals or aluminium or by the simple absorption of the dyestuff by the substrate.

The colouring agents used in the present invention are commonly known as "vat dyes" in the terminology of the Colour Index which, both with regard to their chemical structure and also in respect of the properties of the process which follows during dyeing, yield excellent results with regard to their light-proof qualities, their ability to withstand chemical agents and, consequently, their stability from every point of view. These dyestuffs belong generally to the groups of the anthraquinones, the indigoids and the phthalocyanines. Similarly, although it is possible to employ a wide range of substrates, such as bismuth oxychloride, zinc oxide, barium sulphate, mica, some of the metallic stearates, some organic substrates (guanine, various polymers, etc.), it has been found that the best results are obtained (whilst being at the same time most "typical" and for practical purposes most useful for the industrialisation of the process) with titanium dioxide, the properties of which as a white pigment having a high covering powder are most suitable for the purpose proposed.

The dyeing of the substrate with the dyestuff, although practically speaking involving the same reactions as take place on effecting the dyeing of other materials, such as textile fibres, is performed in a completely different manner, the oxidation of the leuco base being effected in situ without any necessity to effect the series of consecutive operations which bring about the oxidation of the said leuco base, once the impregnated material has been withdrawn from the vat-dyeing bath which, in these cases, must be protected as far as possible from contact with the air.

In the present case, oxidation and fixing of the leuco base is achieved by feeding air or oxygen to the bath itself, as will be explained later.

In accordance with these premises, the process consists in initially carrying into effect a colloidal dispersion of the dyestuff in an aqueous alkaline medium, by agitation and heating of the mixture, which is subjected subsequently to reducing treatment, for the purpose of bringing about the molecular dissolution of the dyestuff in the liquid, in the form of a leuco base, agitation and temperature meanwhile being maintained.

Subsequently, and still under the same conditions as to temperature and agitation, the substrate is added, preferably in an approximate proportion of equal parts by weight of the prepared solution of leuco base. It must be remembered that the proportions of solution of leuco base and substrate cannot be established absolutely, since they depend on the properties of the substrate, on the solubility variants of the various dyestuffs and on the final concentration to which it is desired to bring the dyeing procedure—as will be shown later.

Subsequently, the compound is subjected to oxidation, thus obtaining the stage involving the typical dyestuff leuco base of characteristic tonality, whereupon neutralisation of the alkali is proceeded with, by agitation and addition of a strong acid in excess, this being followed by dilution of the resultant compound and separation of the liquid from the solid preferably by alternating centrifuging and leaching which may be effected in separate devices or in the centrifuge itself, accompanied by continuous addition of water, depending on the properties thereof, whereupon finally the liquid residue is eliminated by filtration, thereby obtaining a product of pasty consistency which is subjected to drying. The resultant solid is disintegrated by means of trituration until elementary grains in the form of an impalpable powder are obtained.

Although the pigments obtained in accordance with the process described already exhibit properties which are acceptable with regard to "solidity" and insolubility and are useful for the majority of uses for which they are intended, there has been provided a new, additional treatment step especially intended for those pigments which require to be utilised by the foodstuffs and pharmaceutical industries due to the fact that in the case of some specific solvents there might be a solubility residue.

In accordance with the said new step, the impalpable powder obtained in the process previously described is subjected to the successive action of various solvents, at a temperature higher than boiling point and at high pressure, with intensive agitation, thereby removing the residues of non-fixed dyestuff. The final product is subjected to filtration and drying, without subsequent grinding, whereupon it is ready for use.

The compound resulting from the application of the process described—synthetic pigment complex—constitutes a product of high stability, which resists moisture (insoluble in boiling water), acids and alkalis, between pH 0.5 and 11 at 80–90° C., oxidation agents, and a considerable number of organic solvents (liquid hydrocarbons, alcohols, ethers, ether alcohols, esters, etc.). It is also light-proof and proof against weathering under an atmosphere charged with industrial and domestic fumes, and further conditions of special purity are involved. It is practically non-toxic, even in cases wherein the dyestuffs employed in the process are more or less toxic. This is of obvious importance for the foodstuffs, pharmaceutical and cosmetics industries, in this way providing a wide range of novel dyestuffs which, in future, will amplify the current lists of suitable products.

On the other hand, due to the final treatment provided in the additional process, the pigments obtained guarantee a high degree of insolubility. They do not bleed under the action of boiling water, petroleum ether and a wide range of organic solvents, from those of low molecular weight to those of a higher molecular weight, or under the action of fatty acids and alcohols, or acid and alkaline solutions between pH 0.5 and 11, as already stated.

SPECIFIC EMBODIMENT OF THE INVENTION

For a better understanding of the process described, there is given hereinbelow a practical example of performance, given purely by way of example and without imparting any limitation.

Example

Into an appropriate reactor provided with a special mixer, made from a material which resists acids and alkalis and capable of operating under pressure when necessary, the following components are introduced:

| | Parts |
|---|---|
| Distilled or decalcified water | 800–900 |
| Dyestuff | 40–60 |
| Sodium or potassium hydroxide | 50–80 |

The mixer is set in motion at reduced velocity and heating is effected by indirect steam at 90–95° C., thereby achieving the colloidal dispersion of the dyestuff in the liquid.

There is then added to the dispersion a reducing agent such as sodium hydrosulphite, in the approximate amount of 25 to 30 parts, meanwhile maintaining the temperature and continuing agitation, thereby bringing about the molecular dissolution of the dyestuff in the liquid, in the form of a leuco base.

Whilst maintaining the temperature and agitation, the substrate (titanium dioxide) is added in the approximate proportion of equal parts by weight to the prepared solution.

Then, the solution is subjected to an oxidation process, employing any one of the following systems, as a function of the higher or lower concentration which it is desired to obtain:

(a) Increasing the agitation velocity and arranging the mixer in such manner that a large quantity of air is incorporated in the mixture, maintaining the temperature by heating to compensate for the cooling effect produced by the introduction of cold air; or (b) The blowing of air at high temperature into the mixture; or (c) In a closed reactor, having however an adequate release means for preventing an increase in pressure, injecting oxygen whilst maintaining appropriate flux or flow so as to ensure an atmosphere of 90% of oxygen; or (d) As in the preceding case, but proceeding finally to an increase in pressure during a more or less lengthy time.

Having finished the oxidation, which gives rise to the fixing of the dyestuff on the substrate, whilst covering, with great precision, all the "sinuosities" in the substrate, even including the most marked concavity, the compound is transferred from the reactor to a container which is also provided with a mixer and wherein the residual alkali is neutralised with an acid of high acidity, such as sulphuric, hydrochloric, etc., acid, an excess of acid being added to obtain a pH 1 or 0.5. Dilution is effected with substantially 10 times the weight of water thereof and the liquid is separated from the solid by centrifuging. Various leaching processes are effected at about 90° C., centrifuging being effected on each occasion, and finally the liquid residue is eliminated by filtration in vacuo.

The final product, which is of pasty consistency, is passed to a drier at a temperature of 100–110° C. during the time necessary for totally eliminating the water.

There then follows the dispersion of product into triturated elements at high velocity until it is finally reduced to elementary granules.

The final reduced product, which is already of an impalpable powdered nature, is subjected in a closed container to the successive action of three solvents, preferably an organic ester (amyl, butyl or ethyl acetate, for example), a mixture of a polyhydroxylate with an alcohol ether (propylene glycol+ethylene glycol monacetyl ether) and finally ethyl alcohol, the treatment being effected at a temperature higher than boiling point under high pressure, with intensive agitation, with which operation there are eliminated any dyestuff residues which may not have been absolutely fixed.

Finally, there are effected the filtration and drying of the resultant composition, but without subsequent grinding.

However, it is possible to still further improve the operational process described by introducing therein some variants in respect of two fundamental points thereof, achieving higher concentrations of the final product, whilst at the same time increasing the general yield achieved by the operation.

On the one hand, it has been found that the addition of the substrate to the dyestuff solution, previously subjected to the reducing treatment, prior to the subsequent oxidation treatment, is more effective if carried into effect, not in a proportion of equal parts by weight of solution but with a considerable excess of the latter, in proportions which may attain up to 1:10. However, this does not dispense with the employment of the proportion provided in the process primarily described and indicated in the case of the utilisation of predetermined substrates.

Thus, one of the improvements according to the invention is based on the addition of pigment in proportions which are relatively small by weight relative to the weight of the solution employed, involving ratios ranging between 1:2 and 1:10.

The other phase of the process which can be improved is the reducing treatment to which the solution is subjected before the addition of the inorganic substrate or pigment.

The reducing treatment, especially when dyeing is effected at high concentration, should preferably be carried into effect in "absolute" form without the appearance of premature oxidation which might considerably impair the process. The reducing treatment has therefore been performed in an inert atmosphere, for example, by creating in the interior of the reactor in which this treatment is effected, an atmosphere of carbon dioxide which, substantially does not react with the alkaline medium of the solution treated since the latter does not practically speaking dissolve in water at the high temperatures at which work is done and due to the short time of surface contract.

In some special cases, however, nitrogen is employed for this purpose.

This treatment in an inert atmosphere, with the advantage mentioned that it prevents previous oxidation of the solution, has as its effect an increase in the general yield of the process, with the significant advantages resulting therefrom.

I claim:

1. Method of producing dyed titanium dioxide for pharmaceutical, food and cosmetic purposes, which comprises forming a colloidal dispersion of a vat dyestuff selected from the group consisting of anthraquinone, indigoid and phthalocyanine dyes in aqueous alkaline medium in a reaction vessel by mixing said dyestuff in said medium under agitation and heat, reducing said colloidally dispersed dyestuff under agitation and temperature-maintaining conditions while maintaining an inert atmosphere in the reaction vessel so as to cause dissolution of said dyestuff in the form of a leuco base in said aqueous alkaline medium while avoiding premature oxidation, introducing finely particulate titanium dioxide to the thus obtained leuco base solution in the vessel under agitation and temperature-maintaining conditions, introducing gaseous oxygen into the thus obtained mixture so as to oxidize and fix said leuco base form dyestuff to said titanium dioxide, thus obtaining dyed titanium dioxide dispersed in said medium, and recovering said dyed titanium dioxide which can be used for pharmaceutical, food and cosmetic purposes.

2. Method of producing dyed titanium dioxide for pharmaceutical, food and cosmetic purposes, which comprises forming a colloidal dispersion of a vat dyestuff selected from the group consisting of anthraquinone, indigoid and phthalocyanine dyes in aqueous alkaline medium in a reaction vessel by mixing said dyestuff in said medium under agitation and heat, reducing said colloidally dispersed dyestuff under agitation and temperature-maintaining conditions while maintaining an inert atmosphere in the reaction vessel so as to cause dissolution of said dyestuff in the form of a leuco base in said aqueous alkaline medium while avoiding premature oxidation, introducing finely particulate titanium dioxide to the thus obtained leuco base solution in the vessel under agitation and temperature-maintaining conditions introducing gaseous oxygen into the thus obtained mixture so as to oxidize and fix said leuco base form dyestuff to said titanium dioxide, thus obtaining dyed titanium dioxide dispersed in said medium, adding an excess of strong acid under agitation to said medium containing said dyed titanium dioxide so as to neutralise the alkali, diluting the thus resulting reaction medium, separating the liquid from the solid, thus obtaining a pasty composition, drying said pasty composition, and triturating the thus obtained solid, thereby obtaining dyed particulate titanium dioxide.

3. Method according to claim 1, wherein the introduction of gaseous oxygen is effected by mixing the reaction mixture in such a manner that it absorbs air, and heating the reaction mixture during said mixing so as to maintain the temperature by compensating for the cooling effect of the introduced air.

4. Method according to claim 1, wherein the oxidation is effected in a closed reactor, by introduction of oxygen into the reaction mixture under conditions so as to maintain an atmosphere of 90% oxygen.

5. Method according to claim 1, wherein the oxidation is effected by blowing air at high temperature into the mixture.

6. Method according to claim 2, wherein said dyed titanium dioxide is subjected to the successive action of various solvents at a temperature higher than boiling point, under high pressure and with agitation, so as to remove the residues of dyestuff which are not fixed in the titanium dioxide, the final product then obtained being filtered and dried.

7. Method according to claim 1 wherein the inert atmosphere is a carbon dioxide atmosphere.

8. Method according to claim 1, wherein the proportions of the leuco base solution relative to the titanium dioxide are between 1:2 and 1:10.

9. Method according to claim 2 wherein the inert atmosphere is a carbon dioxide atmosphere.

References Cited

UNITED STATES PATENTS

| 1,978,797 | 10/1934 | Hailwood et al. | 106—289 |
| 1,988,483 | 1/1935 | Croakman | 106—289 |
| 2,107,159 | 2/1938 | Martone | 106—289 |
| 2,772,984 | 12/1956 | Helfaer | 106—289 |

FOREIGN PATENTS

| 404,262 | 7/1932 | Great Britain | 106—289 |
| 1,000,531 | 8/1965 | Great Britain | 106—289 |

JAMES E. POER, Primary Examiner

U.S. Cl. X.R.

106—300